United States Patent [19]

Silvana

[11] 3,918,679

[45] Nov. 11, 1975

[54] UNIVERSAL COUPLING

[76] Inventor: Baracchi Silvana, via Pontebbana, Fiume Veneto, Italy

[22] Filed: Dec. 15, 1971

[21] Appl. No.: 208,108

[30] Foreign Application Priority Data

Aug. 22, 1970 Italy ................................. 83354/70
Jan. 1, 1971 Italy ................................. 83302/71

[52] U.S. Cl. .......... 251/149.1; 251/149.6; 285/249; 285/316
[51] Int. Cl.² ................... F16L 29/00; F16L 37/28
[58] Field of Search ...... 251/149.6, 149.1; 285/249, 285/315, 316, 177

[56] References Cited

UNITED STATES PATENTS

| | | | |
|---|---|---|---|
| 2,099,335 | 11/1937 | Hansen | 251/149.6 |
| 2,823,934 | 2/1958 | Gorrell et al. | 251/149.6 X |
| 2,905,485 | 9/1959 | Zavac | 251/149.6 |
| 3,224,728 | 12/1965 | Boseth et al. | 251/149.6 |
| 3,330,529 | 7/1967 | Hansson | 251/149.6 |
| 3,601,361 | 8/1971 | Hundhausen | 285/316 X |
| 3,606,396 | 9/1971 | Prosdocimo et al. | 285/249 X |

*Primary Examiner*—William R. Cline
*Attorney, Agent, or Firm*—Bruce K. Thomas

[57] ABSTRACT

Coupling means for flexible conduits are disclosed having interengaging quick release male and female elements held in fluid sealed relationship by any external spring biased sliding bell or collar, carried by the female element. Stop means are provided to limit the sliding relationship between the collar and the female element, one of which comprises a resilient tongue or catch element having a camming tooth that engages over a protuberance on the periphery of the female element. The female element includes a valve seat engageable by a valve element held in guided relationship by an inner extension of one of the conical nipples upon which the inlet hose end is compressed. The male element includes support means to engage the valve element to hold same in open position upon connecting the male and female elements. The sealed quick-release interlock between the male element and the female element is accomplished by means of at least one annular sector-shaped fastening means carried in a recess in the female element, held in place by the sliding collar into a locked position against a groove in the male element. Forcing the sliding collar against the other stop means provides space into which the annular fastening means is carried radially outward from the locked position by the sloping sides of the groove of the male element as the male element is removed. The valve element includes a resilient surface and guide means so as to seat against the valve seat and effectuate a seal that is proportional to the fluid pressure. Modified split ring elastic elements are disclosed that encompass the outside surface of an end of a flexible conduit to improve the gripping and sealing of the conduit on a conventional serrated conical nipple regardless of the diameter or wall thickness of the conduit and using a known form of clamping ring. The check valve element is removable and may or may not be used as desired.

14 Claims, 17 Drawing Figures

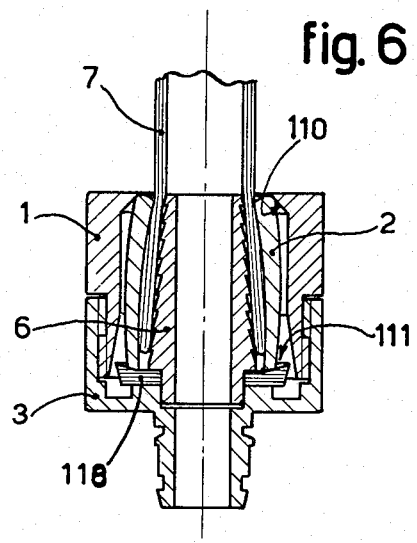
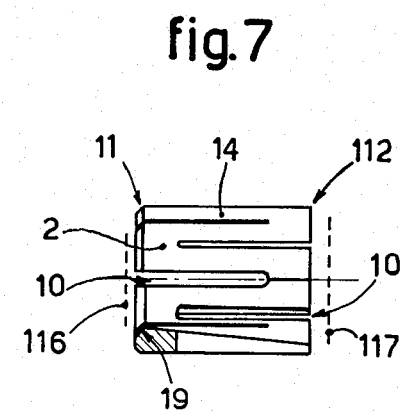
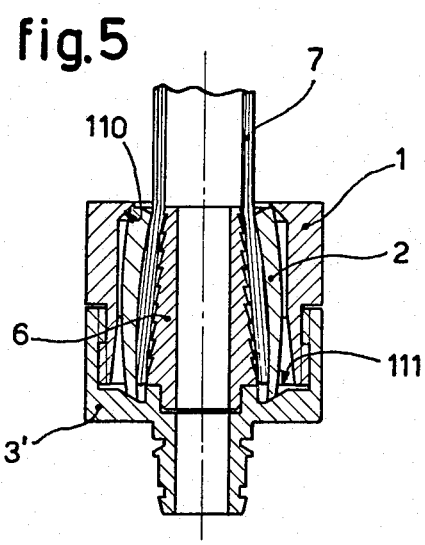
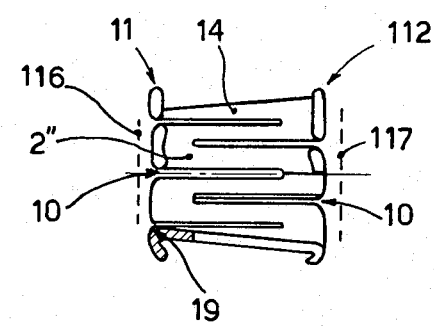
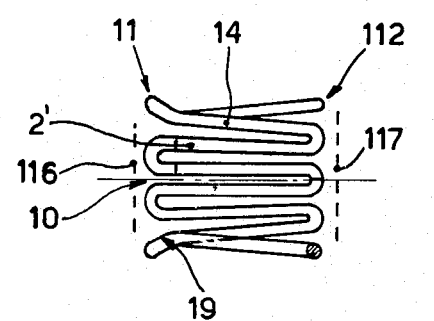
fig. 6
fig. 7
fig. 8
fig. 5
fig. 9

UNIVERSAL COUPLING

SUMMARY OF THE INVENTION

Briefly this invention provides a universal coupling for flexible conduits used in gardening and irrigation systems and the like, which facilitates the attachment of flexible conduits of different sizes; eliminates the use of clamps and provides interengaging male and female elements which are engaged and locked together by means of one or more annular fastening means engaged between a camming groove on the male element and an annular slot in the female element, the fastening means being controlled by a spring biased sliding collar that is locked for limited axial movement to and upon the female element. In one embodiment a pair of annular fastening means is used that engage the male element on opposite sides and a blocking means is provided to retain the annular fastening means in place. The female element defines a valve seat and the adjacent nozzle, to which the hose end is attached, defines a housing in which a valve element is contained. The male element includes a central support, in its main conduit, which engages and opens the valve element upon engaging the coupling parts together. A secure seal to the flexible hoses is provided by modifying the elastic elements that encompass and press the hose ends to the serrated conical nozzles or nipples by means of flexible blades defined between alternate radial notches forming a toric ring. Guides are provided at one end of the inside rings which engage recesses in the bell of the male element and prevent rotation of the rings during compression.

The universal coupling of this invention provides a secure seal in the inlet part in the disconnected relationship of the male and female members through a guided check valve element and a secure seal for the assembly in the connected relationship by the interlock between the inlet hose coupling and the female element; an O-ring seal between the male and female elements and an interlock between the male element and the discharge hose coupling, using few parts of simple compact design that are easy to use, assemble and manufacture. The seal of the check valve element is always proportional to the fluid pressure by providing a reduction about the valve stem inside the seating surface thereof so that it is made more resilient and responsive to sealing pressure by the fluid on the upstream side and with least resistance to fluid flow (back pressure) in the open position. In addition this reduction about the stem avoids localized shrinking that cannot be located, thus making it possible to obtain an almost perfect closing zone.

The sliding bell or collar, used to couple and uncouple the assembly includes means to limit its travel or reciprocation upon the female element such as abutting edges in one direction and flexible fingers or tongues with teeth that engage over beveled indentations on the periphery of the female element, in the opposite direction of movement. Furthermore, the locking system between the male and female elements is positive and distributes the working stresses over a wide surface of their annular shape. These annular semi-circular locking elements fit into discontinuous slots in the wall of the female element and include transverse side wings that allow radial movement (perpendicular to the axis of the coupling device). The locking elements are forced into a secure locked position by the blocking action of the fastening means or rear wall of the slots behind the semicircular locking elements without vibration. The locking elements or sectors have greater diameters than the toric groove in the male tang or element and are set or held off center therein with respect to the outside diameter, thus the radial travel distance between lock and unlock or disconnect of the sectors with the male tang is reduced.

The locking means or sectors have beveled front and rear ends which reduce the pressure required for seating and locking. The locking means are also provided with two side wings which act as guides. These wings are beveled and housed on the sides by niches in the slots housing same and serve to limit the travel stroke by acting on the bevels.

DESCRIPTION OF THE DRAWINGS

In the drawings the several illustrative embodiments of the invention are shown wherein:

FIG. 5 is a cross-sectional view illustrating an intermediate coupling and one form of radially split inside ring compressing a hose end upon a serrated nipple;

FIG. 6 is a cross-sectional view illustrating an intermediate coupling similar to that of FIG. 5, but including an additional seal;

FIGS. 7, 8 and 9 are plan side views of other forms of split inside rings;

DESCRIPTION OF THE PREFERRED EMBODIMENTS

Figure 1:
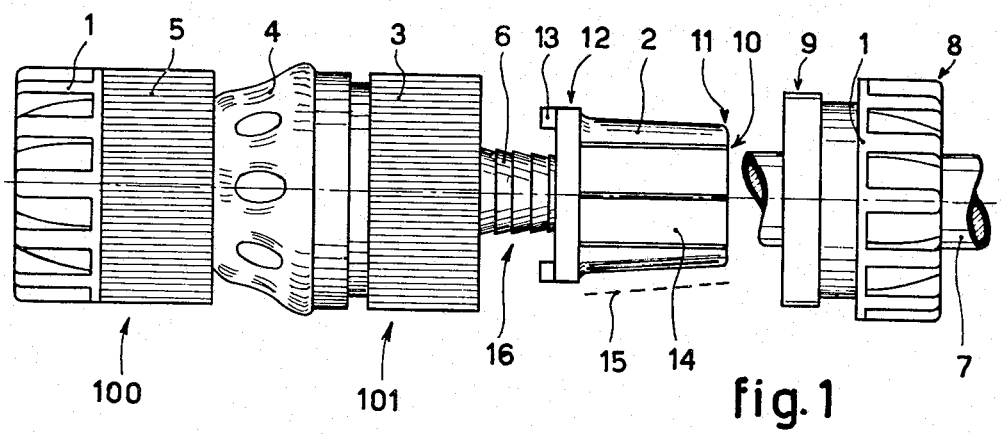
FIG. 1 is a side view of one form of quick hose coupling of this invention with the hose coupling portion on one end shown in partially disassembled form.

With regard to the figures described, wherein like parts bear like numerals, and in particular to FIG. 1, reference 1 is the outside clamping ring and with serrations 8 for gripping with the fingertips and provided with the male threads 9 on the inner end; reference 2 is the inside resilient ring with radial notches 10 therein that divide the reference section 15 of the ring into elastic elements 14. Further the ring 2 presents the bevel 11 at one end and includes the reinforcement 12 at the other end and with the guides 13 protruding axially therefrom which prevent, as stated previously, the ring 2 from turning when outside clamping ring 1 is screwed thereon. The bell 3 comprises the female part of the coupling. The outside of bell or female element 3 carries the projections 8 to facilitate the gripping of the fingertips. The bell or female element carries the nozzle 6 axially therefrom. The nozzle 6 is provided with the peripheral exterial conical sections or serrations 16. The reference 4 is the sliding collar on the bell 3 which serves to quickly release and lock the other clamping ring 1 in the assembly. The reference 5 is the bell carrier or male element of the assembly and the reference 7 is the rubber or plastic hose.

The assembly 100 of the outside clamping ring 1, the male element 5 and the inside clamping ring 2 comprises a modified hose coupling. The assembly 101 including the sliding collar 4 and the female part 3 comprises a quick disconnect between a hose coupling 100 and other parts as will be described.

Figure 2:
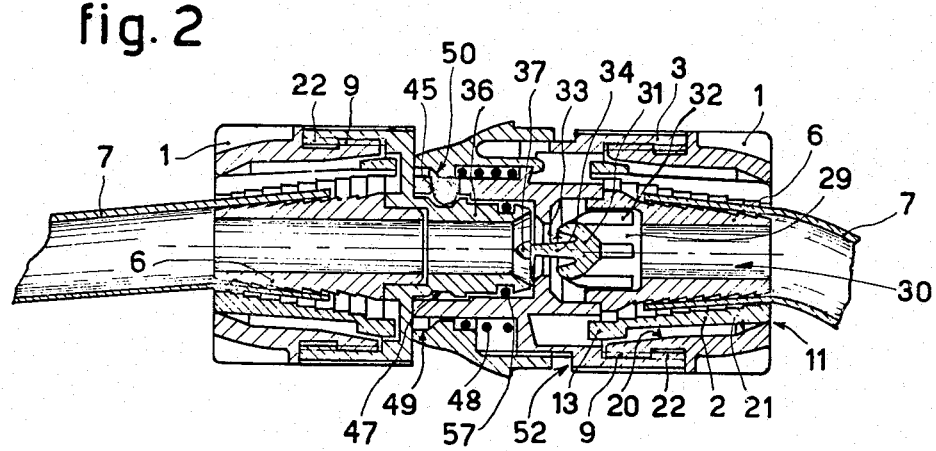
FIG. 2 is a longitudinal cross-sectional view of the coupling of FIG. 1 in the coupled condition with the check valve open.
Figure 4:
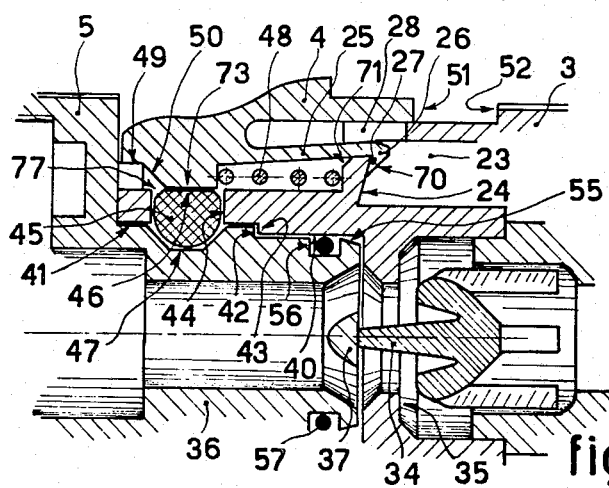
FIG. 4 is an enlarged, fragmentary cross-sectional view of a portion of FIG. 2 to show more clearly the relationship of the parts.
Figure 3:
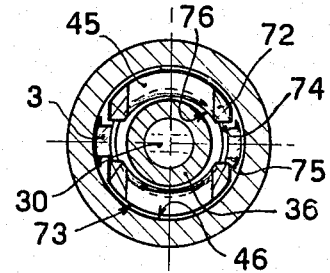
FIG. 3 is a cross-sectional view through the axis of the coupling to show the fastening means between the male and female elements.

With reference to FIG. 2 and following FIGS. 3 and 4, the clamping rings 1, at each end of the assembly, are identical and each carries on its inside two characteristic conical sections 20 and 21. The sections 21, at the outer end being more inclined act on bevel end 11 of the inside ring 2 in a manner known in this art.

The female threads 22 in the housing portions of the male elements 5 engage the male threads 9, of the clamping rings to hold the hose 7, through the inside rings 2 upon the nozzles 6. The female bell part 3 is provided with the indentations or reductions 23 which have bottom walls 24 inclined toward the inside and serve to contain the guides 13 provided at one end of the inside ring 2 and further serve to house means limiting the outward travel of the sliding collar 4 as will be described. The means to limit the reciprocation of the sliding collar are part of the collar 4 and are made up of one or more of the resilient tongues 25 that carry on their ends a tooth 26 which presents a projecting part 27 against the inclined base or bottom 24. When the tongues 25 are pressed into position, they spread radially and this, along with the inclination of projecting part 27, facilitates and improves the fastening.

To facilitate initial assembly, the tooth 26 carries the external bevel 70 which during the assembly phase works or cams against the bevel 71 on the opposite side from the bottom 24, thus forcing the tongues 25 to bend or spread automatically, which to be able to come in contact with the opposing base or bottom 24, pass through the holes or outer recesses 28 which open at the corner of the female part 3. The nozzle 6 engages, abuts against or nests partially within the open end of the female part 3 at the upstream end, in sealed relationship and adjacent this juncture is provided with the widened bore portion 29 which communicates with the bore or conduit 30 of the serrated nozzle 6. The widened bore 29 provides a housing for the reciprocable valve element 31 and the latter is provided with the longitudinal and spaced guides 32 for this purpose. The valve element 31 is flared and carries the reductions or bore holes 33, to make same more resilient and responsive to sealing pressure, and also includes the rearwardly (downstream) extending axial nozzle, extension or stem portion 34. When the valve element 31, which can also be activated by a spring, not shown, acts against the valve seat 35 provided in the female part 3 and surrounding the central conduit 30, the reductions 33 permit it to be deformed under fluid pressure to guarantee a good sealing, the deformation being proportional to the load.

As shown in the drawings the male element 5 has a larger knurled section at one end and an integral tubular extension or male part 36 at the other end, with a central bore aligned with the bore or conduit 30 that extends through the coupling and includes a support or abutting element 37 at the extended end of this central bore. This support or stop 37 is held in place by radial spider members (not shown). The male element 36 fits within and substantially conforms to the recess defined by the concentric cylindrical sections 41 and 40 within the downstream end of the female part, including the circumferential off-set base or shoulder 43 therein and terminated by the transverse wall that defines the valve seat 35. The nozzle or stem 34 of the valve element 31 when seated on the valve seat 35 extends within the female part 3. The male part 36 includes a matching base or circumferential off-set 42, which registers against the shoulder 43 of the female part.

By engaging the male element 36 in the bores 41-40 of the female part, ust described, the support 37 acts on stem 34 and moves the valve element 31 back, opening the passage 30 to the fluid from the inlet side. Thus, the female part 3 is made up of two cylindrical sections 40 and 41, the former of larger diameter than the latter, which are separated by a base 42 which serves to work against corresponding base 42 present in the male element 36. The main wall of the female part 3 opposite the larger cylindrical section 41 is provided with a pair of circumferential slots 44, the side walls of which provide a seat and guide for the arcuate segments or male fastening means 45. The seats or slots 44 house the fastening means 45, in this case the fastening means being made up of half circles, shown in FIG. 3, which are held in the seat by cylindrical section 46 present in the sliding collar element 4 and fit into the continuous circumferential groove 47 provided around male element 36; they further have two side wings whose planes of support are indicated by 72 (FIG. 3). These wings have a bevel 74 which works against stop 75, comprising the end wall of each slot present in female part 3 to limit the forward travel, and therefore prevent unbalance or slipping out of fastening means 45.

The inner surfaces 76 of the fastening means 45 are wider or greater in diameter than the seat or groove 47, thus eliminating further travel in the opening phase.

To guarantee maximum blocking and interlock, the curved bottom 76 of the fastening means 45 transverse the groove 47 is fitted to and substantially conforms with the said groove 47. The outside curved part 73 of the sliding collar 4 has the same diameter of the fastening means 45, minus the tolerance, as the opposing curved surface 46 of the fastening means 45, same being cylindrical and beveled at the edges 77 on the sides.

The sliding collar element 4 is held in (locked) position for blocking or holding the fastening means 45 by the elastic or biasing means 48, which in this case can be a coil spring, as illustrated. The spring 48 is engaged between the shoulder of the curved part 73 and the flange of the female part 3 which defines the bevel 71 and the bottom 24.

In order to free the fastening means 45, the sliding collar element 4 is moved against the bias of elastic means 48 so that the fastening means 45 register with the cylindrical part 49 at the open end of the female part 3. In this position all that is required is to pull male element 36 and the conical edges of the trapezoidal groove 47 shove or cam the fastening means 45 radially outward, thus freeing the male element 36. The stop members or end walls 75 retain the fastening means within the female part 3, and the abutment of base 51 against base 52 limits the travel of the sliding collar 4 during this release operation.

To put the fastening means 45 back in fastening or locked position, all that is required is to let the sliding collar 4 be free, which in its return travel causes the beveled section 50, with a truncated conical shape, to rest on or cam against the means 45 and forces them again into their seat.

As is apparent in order to make the fastening means 45 not function, the sliding collar 4, with its base 51, is held in the open position against the base 52 provided in female part 3. Thus, the sliding collar 4 is moved only as much as is necessary to free the fastening means 45.

The male element 36 is provided with the front conical section 55 to facilitate its insertion in the female part and to be able to thrust the fastening means 45 out. Behind the conical tip 55 is the housing or groove 56 for the seal ring 57 of the O-ring type. The latter is pressed in cylinder 40 of the female part, causing the hydraulic seal of the rapid connection.

According to FIGS. 5 and 9, alternative structures for the inside ring 2 are shown which make it more elastic, and therefore more adaptable to the various measurements of the hoses to be coupled.

FIG. 5 illustrates an intermediate coupling, with the female part and sliding collar removed, and the manner in which the combined conical section 111 of the male element 5 (3) and the conical section 21, of the clamping ring 1 wedge the blades 14 of the elastic inside ring 2 as at 110, from two directions, upon the hose 7 and seal it around the serrated nozzle 6 as these parts are drawn together by their threaded engagement. The edge 112 of the elastic inside ring (see FIGS. 7, 8 and 9) cams against the conical section 111 to provide a practically circumferential restricting action around the hose as allowed by the notches 10. By providing alternating notches in the elastic inside ring the constricting action is distributed more over the length of the clamping members.

In FIG. 6 the male element 5(3) has been modified to include a base upon which the substituted ring 118 rests. This ring 118 has the conical inside portion, also indicated at 111, which functions to bring the inner end of the elastic inside ring 2 into circumferential pressure contact with the hose 7 and also seals this part of the assembly.

As shown in FIG. 7, the elastic inside ring 2 has alternating radial notches 10 cut through this tubular body. One end or so-called upper part 116 is thicker than the other end or lower part 117, and the body of each blade 14 tapers to the edge 112. The thicker end 116 has the outside bevel 11 and the inside bevel 19.

In FIG. 8, the elastic inside ring 2 is in the form of a toric ring and the bevel 11 at the inside end 116 is carried on protuberances or flanges while the inside bevel 19 is formed at the curved base of the flanges. The edges 112 at the end 117 are carries on similar flanges. This ring 2 can be formed from a stamped sheet of suitable material.

Referring to FIG. 9, the elastic inside ring 2 is shown formed of looped piano wire with the bevels 11 and 19 and the edge 112 defined by the upturned ends of the loops at the upper part or end 116.

Finally, it is to be noted in FIGS. 5 to 9, that the improvements of the invention relating to these split rings can either be applied to universal couplings already on the market (logically by adopting the measurements) or be applied to new universal couplings, or to form new universal couplings.

The bottom of the bell of the male element 5 (3) or substituted ring 118, is made so as to transform, by conicity 111 that acts on edge 112, axial thrusts into radial or sub-radial thrusts, which, by acting on blades 14, end by elastically deforming the blades by fitting them to the end of the hose 7 by compressing the latter against serrated nozzle 6.

Since the particular form that transforms the axial thrusts into radial or sub-radial thrusts, is also present in the outside clamping ring 1 and precisely at conical portion 21, referred to in FIG. 6 at 110, the blades 14 are deformed either in upper part or end 116 or in lower part or end 117 of inside split ring 2, or both.

Therefore, the action exerted by outside clamping ring 1, which turns while approaching male element 5, is transformed completely into a radial locking action on hose 7 by inside ring 2. Further, the S shape of inside ring enables it to be expanded or compressed much more than traditional rings.

By using the improvements shown, it now is possible to obtain, with few accessories or by modifying only some parts, components, auxiliary and non-essential parts, various combinations so as to enable one to meet any requirements of a system for conveying and distributing a fluid, a system of the type particularly suitable for gardening.

Figure 10:
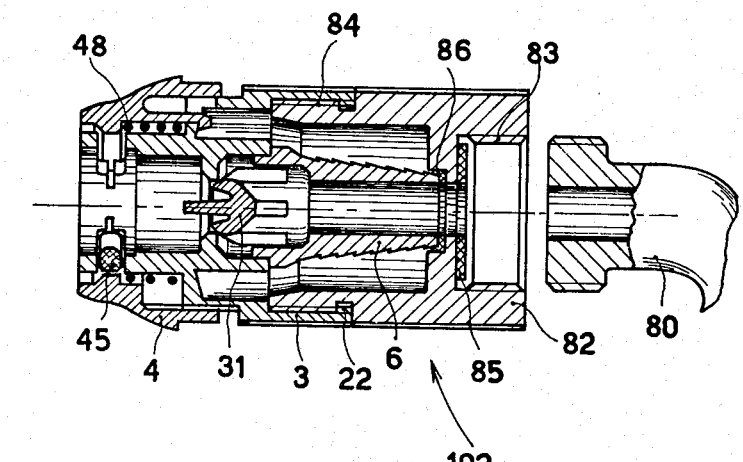
FIG. 10 is a partial cross-sectional view of an alternative form of coupling for use with a faucet wherein the male element is removed and the check valve is closed.

With reference to FIG. 10, there is shown a modified coupling 102 which in place of clamping ring 1 and the split ring 2 is provided with an auxiliary element 82 which carries in the upper part or one end the threads 83, which can be mounted on a threaded faucet 80 and carrying in the lower part or other end the threads 84 which can be screwed onto the threads 22 of the female part 3, in this case, or of the male element 5 as and instead of threads 9 of the clamping ring 1.

The hydraulic seal is achieved by the gasket fitting 85 and 86 of which one acts against faucet 80 and the other against the end of the serrated nozzle 6.

Figure 11:
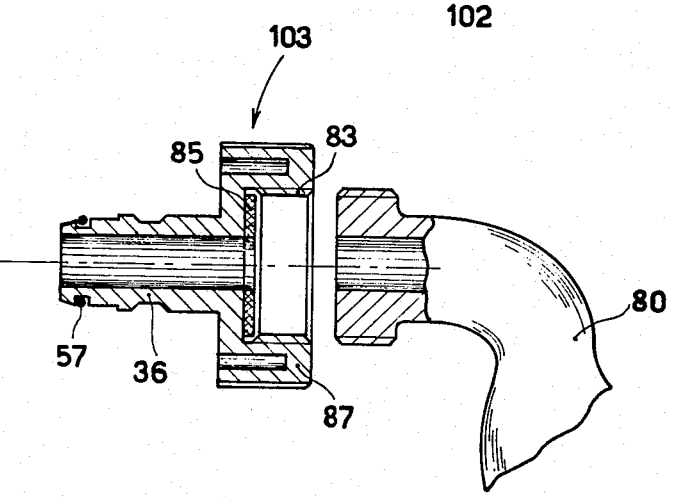
FIG. 11 is a partial cross-sectional view of another alternative form of auxiliary element, namely, a modified male element that can be used in accordance with the invention.

In FIG. 11 there is shown another modification 103 comprising an auxiliary element which is made up of a modified bell or male element 87 with threads 83 and having a male tang or part 36 as has been described and shown above. The threads 83 can be screwed either on the male threads of a faucet 80 or on other auxiliary elements such as whirling sprinklers, nozzles, grips, brushes, etc.

Figure 12:
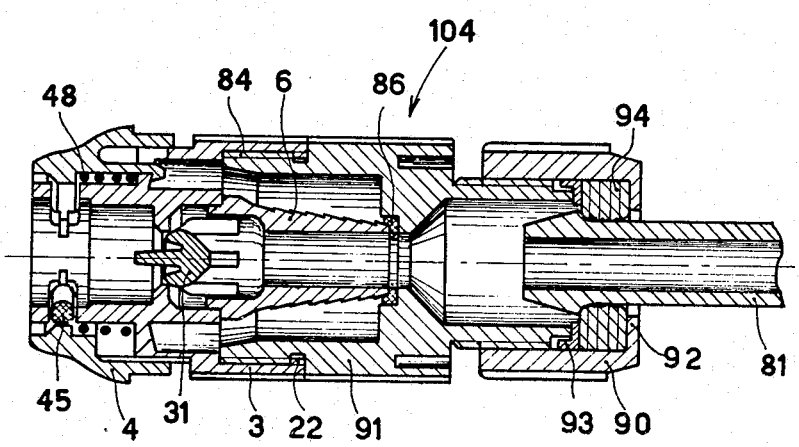
FIG. 12 is a cross-sectional view of still another form of auxiliary coupling with the male element removed and the valve in the closed position.

FIG. 12 shows a composite auxiliary element 104, enabling connections to be made directly to a water source 81 comprising an apartment laundry faucet.

Said auxiliary element comprises pressure and sealing means and a connecting and sealing means, the pressure means comprising the ring 90, which screws on a support 91, which with the lip or internal flange 92 compresses, against the ring 93, an elastic ring 94. The ring 94 is thereby deformed inwardly and fastens in a stationary way the coupling to the source and at the same time guarantees the hydraulic seal.

Figure 13:
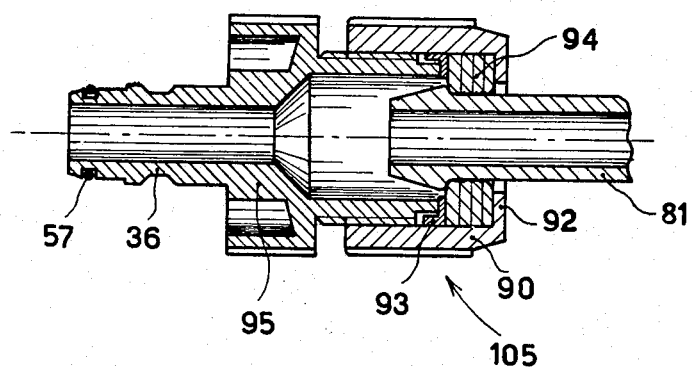
FIG. 13 is a cross-sectional view of still another auxiliary coupling for use on household laundry faucets.

In FIG. 13 there is shown a coupling 105 for adapting to a distribution source 81 comprising a body 95 carrying male element 36.

Figure 14:
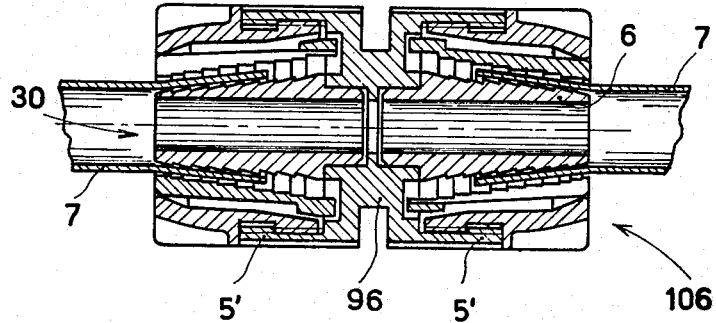
FIG. 14 is a cross-sectional view of a simple hose coupling shown in the coupled condition.

FIG. 14 shows a double coupling 106 in which the body 96 is constructed by joining the two bells 5 without their male tangs 36. The remaining components are those of a standard coupling and are similar except for the inside rings.

Figure 15:
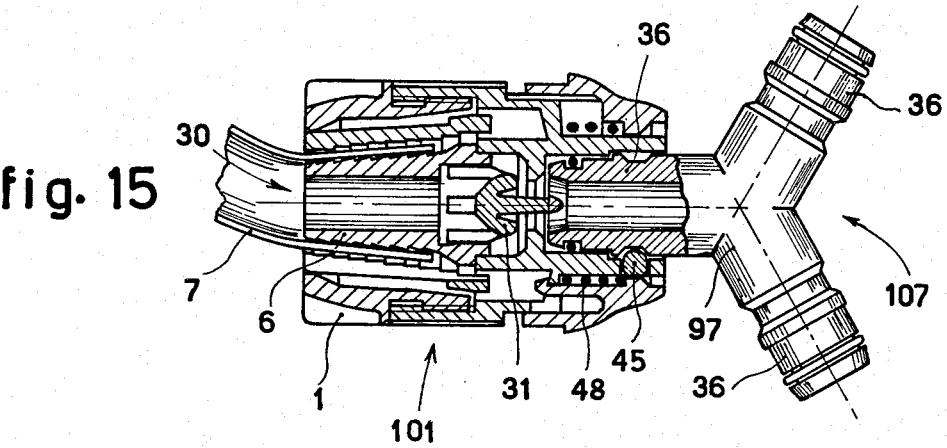
FIG. 15 is a partial cross-sectional view of a hose coupling with a bifurcated male member.

FIG. 15 shows an auxiliary Y element 107 whose body 97 is constructed by combining three male tangs 36, said element 107 serving to take the flow from a female coupling 101, preferably with a non-return valve 31, and transmit it to two female couplings which, in this case, can be without a non-return valve.

Figure 16:
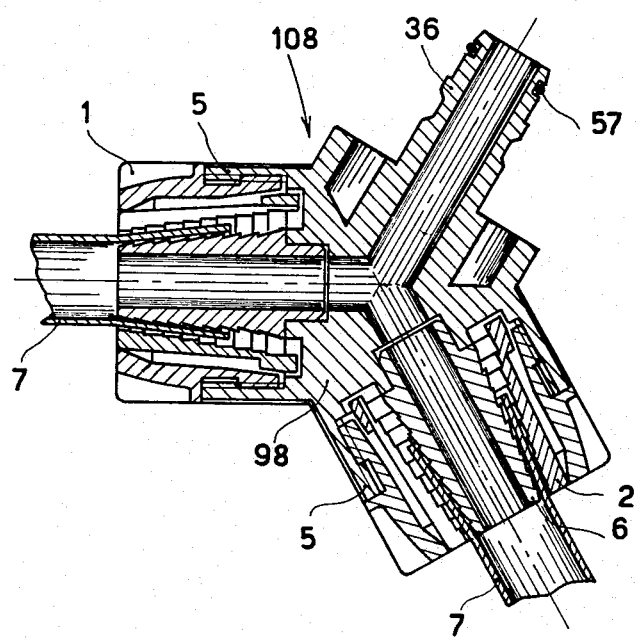
FIG. 16 is a cross-sectional view of an alternative form of coupling disconnected from the female element and provided with two hose connections for divided flow.

FIG. 16 shows a Y coupling 108 whose body 98 is constructed by combining two bodies 5 with a male tang 36, this coupling serving to receive the flow, preferentially from a female coupling with a valve on the male tang 36 and then to distribute it directly to the conveying hoses 7.

Instead of two bodies 5 there can be provided two bodies 3.

For a better understanding of the components comprising the present invention that have been described above and preferentially shown in the drawings, it is seen that the hose coupling 100 comprising the base coupling carrying the male element 5, is for rapid hose engagement connection; the disconnect or female coupling 101 carrying the female part element 3 is a rapid engagement connection between hose couplings and the auxiliary element 102, the composite coupling shown in FIG. 10, is for faucets carrying as part of the combination the female element 3 of base coupling 101 is also for faucets. The auxiliary element 103 carrying the male element 36 provides a rapid engagement connection to a female coupling unit 101 while the composite coupling 104 shown in FIG. 12, carrying mounted therein the female element 3 of the base coupling 101, is adapted to convert to nonthreaded faucets. The auxiliary composite element 105 shown in FIG. 13 and carrying the male element 36 is another rapid engagement connection; the double coupling 106 is suitable for joining and/or extending two hoses; the Y diverter auxiliary element 107 is made up of three male elements for rapid engagement connection and the composite coupling 108 shown in FIG. 16 can be used to divide a stream for use at two locations.

Figure 17:
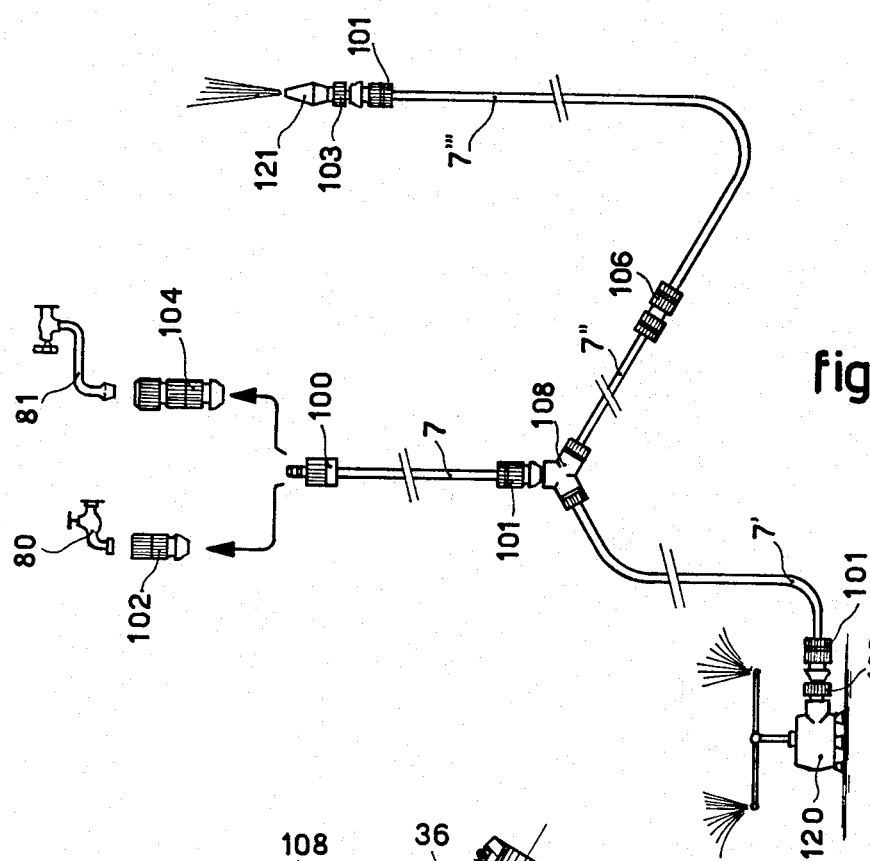
FIG. 17 is a plan schematic view showing the possible combination of hose, faucet and end use connectors that can be made with the couplings of this invention.

Using the general references just indicated, FIG. 17 is a non-limiting example of application of all above mentioned couplings with the improvements, and the objects of the invention.

The coupling 100 can be engaged on composite couplings 102 and 104 which will connect it to the distribution source respectively, indicated by the faucets 80 and 81, as desired, In the example, composite couplings 102 and 104 carry check valves 31 and, only if coupling 100 is inserted, do they open and deliver the fluid under pressure, since the source is then open and able to deliver without further maneuvering.

From coupling 100 the hose 7 connects it to the female coupling 101 of FIG. 1, the latter is connected to the composite coupling 108 from which extend the two conduits 7 and 7. The conduit 7 feeds the coupling 101 which through auxiliary element 103, and only if it is inserted, transmits the fluid under pressure to the whirling sprinkler 120. The conduit 7 continues with conduit 7 through the double coupling 106 and feeds the coupling 101 which, if auxiliary element 103 is inserted, in turns feeds the nozzle 121.

As can be seen from the components shown, with slight variants or modification or only by substituting certain component parts, it is possible to achieve a very wide and complete range of couplings and auxiliary elements, which makes possible a great savings in the manufacturing, the buying or use of the devices of this invention phase.

What is claimed is:

1. A universal hose coupling comprising:
   male body means defining an open-ended bell at one end and a projecting externally and circumferentially grooved male element at the other end with a fluid passageway therethrough;
   female body means defining an external housing portion and having an internal tubular wall portion defining an internal bore;
   one end of said tubular wall portion of said female body means projecting beyond said housing portion and defining an internal bore operative to axially receive said projecting male element at an interface in circumferentially sealed relationship with the fluid passageway of said male element open therethrough;
   a slot through the tubular wall portion of said female body means opening into said internal bore and radially opposite one of said external grooves of said male element when in said sealed relationship;
   collar means encompassing and slidably carried by said projecting wall portion of said female body for axial reciprocation thereon;
   stop means limiting the axial reciprocation of said collar means;
   said collar defining at one end a recess larger than the diameter of said projecting wall portion and having a tubular portion encompassing said projecting wall portion of said female body in sliding relationship adjacent said recess;
   means biasing said collar means against one of said stop means with said recess registering over said arcuate slot in said tubular wall of said female body means; and
   fastening means carried in said slot and engageable across said interface with a groove of said male element to maintain a locked relationship;
   said fastening means comprising an arcuate member substantially conforming in curvature with the outside of said tubular portion of said collar means and having a larger non-conforming seat of curvature within said groove of said male element; and
   said fastening means being radially movable from said groove on said male element upon sliding said collar means against the other of said stop means whereby to register said recess of said coller means opposite said arcuate slot in said tubular wall portion of said female body means to release said fastening means from interengagement across said interface between said male and female body means.

2. A universal hose coupling in accordance with claim 1 in which:
   stop means includes a pair of axially spaced circumferentially off-set base walls in the periphery of said housing portion;
   one of said base walls abutting the end of said coller means to limit the release position thereof; and said collar means includes a tooth member at the extended end of a resilient axial tongue member adapted to engage over said other base wall of said housing portion to limit the release position thereof.

3. A universal coupling in accordance with claim 1 in which:
said groove on said male member includes a beveled side wall operative to cam against the under side of said fastening means to move same radially from said groove into said recess upon release of said collar means and withdrawal of said male body means.

4. A universal coupling in accordance with claim 1 in which:
a pair of said fastening means is carried in said slot on opposite sides of said tubular wall portion, each being registerable with said groove in said male element.

5. A universal coupling in accordance with claim 1 including:
a tapered serrated nozzle within said open-ended bell of said male body means having a passageway communicating with said fluid passageway therein and operative to be received within the open end of a flexiblehose;
a clamping ring axially and threadably engageable with said open-ended bell of said male body means and having a constricting beveled end opening;
said clamping ring encompassing said flexible hose in spaced relationshi;
a flexible tubular ring member within said space and having its sidewall encompassing said flexible hose;
said flexible ring member having an end edge in juxtaposition with said constricted bevel end opening of said clamping ring; and
including a series of longitudinal elastic elements defined by alternating elongated slits in the side wall of said flexible ring members whereby the engagement of said clamping ring with said open-ended bell of said male body uniformly compresses said flexible ring member upon said flexible hose in sealed relationship with said serrated nozzle.

6. A universal hose coupling in accordance with claim 5 in which:
said external housing portion of said female body means defines an open-ended bell;
a second tapered serrated nozzle is provided within said tubular wall portion spaced from said bell and operative to be received within the open end of a second flexible hose;
a second clamping ring axially and threadably engageable with said open-ended bell and having a constricted beveled end opening;
said clamping ring encompassing said flexible hose in spaced relationship;
a second flexible tubular ring member within said space and having its sidewall encompassing said flexible hose;
said flexible ring member having an end edge in juxtaposition with said constricted bevel end opening of said clamping ring and including a series of longitudinal elastic elements defined by alternating elongated slits in the side wall of said flexible ring member whereby the engagement of said clamping ring with said open-ended bell engages said beveled end opening upon said flexible ring member, said uniformly compresses said flexible ring member upon said second flexible hose in sealed relationship with said second serrated nozzle.

7. A universal hose coupling in accordance with claim 5 in which:
said internal bore of said tubular wall portion of said female body means includes a circumferential valve seat;
a hose coupling member associated with said tubular wall portion of said female body means including a second nozzle member operative to be encompassed at one end by a second flexible hose;
said second nozzle member including a valve housing at the other end opposed to said valve seat;
a check valve member slidably mounted within said valve housing and including a valve stem axially oriented within said valve housing and protruding into said internal bore of said interior tubular wall portion in its closed position against said valve seat; and
said male element providing a support member axially aligned with said valve stem of said check valve member;
said support registering with said valve stem to move said check valve member from its closed position to an open position upon insertion of said male element into said internal bore of said female body means.

8. A universal hose coupling in accordance with claim 7 in which:
said valve member provides a flexible valve-seat-engaging surface around said valve stem defined by a reduction therebetween; and
includes a plurality of longitudinal axially oriented and circumferentially spaced guide members, the outer surfaces of which are slidably contained within said valve housing and defining a series of passageways about said valve-seat-engaging surface.

9. A universal hose coupling in accordance with claim 8 in which:
said male element is provided with a circumferential resilient sealing ring for engagement with said internal bore of said tubular wall portion.

10. A universal hose coupling comprising:
male body means defining an open-ended bell at one end and a projecting externally and circumferentially grooved male element at the other end with a fluid passageway therethrough;
female body means defining an external housing portion and having an internal tubular wall portion;
one end of said tubular wall portion of said female body means projecting beyond said housing portion and defining an internal bore operative to axially receive said projecting male element in circumferentially sealed relationship with the fluid passageway of said male element open therethrough;
a tapered serrated nozzle within said open-ended bell of said male body means having a passageway communicating with said fluid passageway therein and operative to be received within the open end of a flexible hose;
a clamping ring axially and threadably engageable with said open-ended bell of said male body means and having a constricting beveled end opening;
said clamping ring encompassing said flexible hose in spaced relationship;

a flexible tubular ring member within said space and
having its sidewall encompassing said flexible hose;
said flexible ring member having an end edge in juxtaposition with said constricted bevel end opening
of said clamping ring;
including a series of longitudinal elastic elements defined by alternating longitudinal slits extending
through the said wall of said flexible ring member
whereby the engagement of said clamping ring with
said open-ended bell of said male body uniformly
compresses said flexible ring member upon said
flexible hose in sealed relationship with said serrated nozzle;
a second tapered serrated nozzle adapted to fit within
and extend from the other end of the tubular wall
portion of said female body means and having a
passageway communicating therewith and being
operative to be received within the open end of a
second flexible hose;
a second clamping ring axially and threadably engageable with said other end of said female body
means and having a constricting beveled end opening;
said second clamping ring encompassing said second
hose in spaced relationship;
a second flexible tubular ring member within said
space and having its side wall encompassing said
flexible hose;
said second flexible ring member having an end edge
in juxtaposition with said constricted beveled end
opening of said second clamping ring;
said flexible ring member having a series of longitudinal elastic elements defined by alternating longitudinal slits extending through the side wall of said
second flexible ring member whereby the engagement of said second clamping ring with said other
end of said female body member uniformly compresses said second flexible ring member upon said
second flexible hose in sealed relationship with said
second serrated nozzle; and
means detachably holding said female body means
upon said male element.

11. A universal hose coupling in accordance with
claim 10 wherein:
said open-ended bell of said male body means is provided with a constricting beveled opening around
said fluid passageway facing said clamping ring;
said flexible ring member includes a second end edge
in juxtaposition with said beveled opening of said
open-ended bell; and
said collar means is operative to compress said end
edges of said flexible ring member against both
beveled openings.

12. A universal hose coupling in accordance with
claim 10 wherein:
said longitudinal elastic elements comprise a series of
reverse looped integral wire members, said slits are
defined by the spaces between said loop and said
end edge is defined by an upturned portion at the
ends of said loops.

13. A universal hose coupling in accordance with
claim 10 in which:
said male body means provides a constricting beveled
groove around said passageway facing the constricted beveled end openings of said respective
clamping rings;
said flexible tubular ring members are longer than the
axial distance between said grooves and said beveled end openings;
whereby tightening of said clamping ring upon said
flexible ring members therebetween compresses
and constricts the ends thereof upon said hoses and
against said serrated nozzles.

14. A universal hose coupling in accordance with
claim 10 in which:
said male body means provides a circumferential seat
within said open-ended bell around said fluid passageway and opened to said constricted beveled
end opening of said clamping ring; and
a ring member on said seat having a conical inner
face adapted to constrictively engage the inner
ends of said elastic elements about said rubber
hose.

* * * * *